(12) United States Patent
O'Neall

(10) Patent No.: US 6,651,005 B2
(45) Date of Patent: Nov. 18, 2003

(54) METHOD FOR ESTABLISHING UNIVERSAL STANDARDS FOR YIELD MEASUREMENT

(76) Inventor: Donald L. O'Neall, Route 1, Box 265, Downs, IL (US) 61736

( * ) Notice: Subject to any disclaimer, the term of this patent is extended or adjusted under 35 U.S.C. 154(b) by 6 days.

(21) Appl. No.: 09/962,776

(22) Filed: Sep. 25, 2001

(65) Prior Publication Data

US 2002/0049541 A1 Apr. 25, 2002

Related U.S. Application Data

(60) Provisional application No. 60/235,129, filed on Sep. 25, 2000.

(51) Int. Cl.$^7$ .............................. G01V 3/38; G06F 19/00
(52) U.S. Cl. .............................................. 702/5; 701/50
(58) Field of Search ..................................... 702/5, 129

(56) References Cited

U.S. PATENT DOCUMENTS

| | | | | |
|---|---|---|---|---|
| 5,771,169 A | * | 6/1998 | Wendte ........................... | 702/5 |
| 5,938,709 A | * | 8/1999 | Hale et al. ..................... | 701/50 |
| 6,061,618 A | * | 5/2000 | Hale et al. ..................... | 701/50 |
| 6,079,340 A | * | 6/2000 | Flamme et al. ............. | 111/178 |
| 6,085,135 A | * | 7/2000 | Steckel ......................... | 701/50 |
| 6,141,614 A | * | 10/2000 | Janzen et al. .................. | 701/50 |
| 6,272,819 B1 | * | 8/2001 | Wendte et al. ................ | 56/11.9 |
| 6,327,569 B1 | * | 12/2001 | Reep .............................. | 705/1 |
| 6,505,146 B1 | * | 1/2003 | Blackmer .................... | 702/189 |
| 6,525,276 B1 | * | 2/2003 | Vellidus et al. ............. | 177/136 |

OTHER PUBLICATIONS

"Using Yield Monitor Data to Determine Spatial Crop Production Potential", Taylor et al., ASAE International Meeting, Jul. 12–16, 1998.*

"Development of a Tomato Load/Yield Monitor", Pelletier et al., Computers and Electronics in Agriculture, Elsevier, 1999, p. 103–117.*

"Comparison of Sensors and Techniques for Crop Yield Mapping", Birrell et al., Computers and Electronics in Agriculture, Elsevier, 1995, pp. 215–233.*

* cited by examiner

Primary Examiner—John Barlow
Assistant Examiner—Toan M Le
(74) Attorney, Agent, or Firm—Emrich & Dithmar (57) ABSTRACT

A method for establishing universal standards as a measure of a crop grower's skill and management uses crop yield and soil productivity values to determine real-time yield indices which are provided such as on a video display during crop harvesting. This allows a harvesting equipment operator to visually inspect the field at the time these measurements are made to observe specific conditions, i.e., weeds, insects, disease, drainage, fertility, etc., at any location in the field to identify opportunities to improve management and cultural practices for any given tract of land. By alerting the operator to the relationships between the various aforementioned conditions, as well as to changes in these relationships, to plant productivity, important information is made available, and may be stored for subsequent review and analysis, for improving crop yields.

12 Claims, 6 Drawing Sheets

METHOD FOR ESTABLISHING UNIVERSAL STANDARDS FOR YIELD MEASUREMENT

This application claims benefit of Provisional No. 60/235,129 filed Sep. 25, 2000.

FIELD OF THE INVENTION

The present invention relates generally to harvesting agricultural crops and, more particularly, to providing real-time information relating to a farm operator's skill and efficiency at producing crops.

BACKGROUND OF THE INVENTION

Harvesters, such as grain combines and cotton pickers, are widely used in the agricultural industry to provide a mechanized and quick manner of harvesting crops from a tract of land. Such machines generally provide a quick and efficient means of separating and collecting the desirable attributes of the crop, such as the grain or the lint, and returning unusable plant residue to the land. Electronic monitors coupled to appropriate sensors are well known in the art for providing the grower with a reasonable means to measure the harvesting process and calculate a real-time yield relating to the quantity harvested on an area of land. Thus, a yield in bushels per acre or pounds of lint per acre can be calculated and displayed to the machine operator as a measure of the productivity of the land as the crop is being harvested. As farm land is commonly highly variable in productivity over the spatial distribution of the land, an indication of real-time yield would be valuable to the grower for determining cultural practices that maximize returns to management on any given tract of land.

U.S. Pat. No. 5,542,606 to Myers describes a method for storing and accessing organized data obtained by a yield monitor for agricultural harvesters. Data is collected, yields are calculated, and information relating to the grain harvested is sorted and stored. Yield monitors may be connected by various means with positioning devices to correlate yield to specific geographic areas.

However, up to now, no attempt has been made to quantify yield results in relation to the underlying soil productivity of the land from which the crop was harvested. One grower may be able to produce good yields from highly productive land, while another grower may be able to produce good yields from lesser productive land, but there is currently no universal comparison to gauge their respective skill and management ability.

The present invention is directed toward a method for providing an expression associating one variable, such as yield, with another variable, such as soil productivity. The relationship between yield and soil productivity is then used in determining and displaying a universal comparison of productivity (Yield Index). Soil productivity indexes are soil ratings established by the United States Natural Resources and Conservation Services for comparing specific soil types in a relational sense. Soil productivity indexes, once established, remain fixed. Through a universal index of yield, a grower's performance and efficiency can be measured against a universal standard, just as financial institutions have techniques for the universal measurement of Return on Investment (ROI) or a baseball pitcher's performance can be rated in terms of his Earned Run Average (ERA). Universal standards and benchmarks are critical to the evaluation of management and cultural practices.

SUMMARY OF THE INVENTION

It is a general object of the present invention to provide a new and improved method for establishing universal standards as a measure of a grower's skill and management. Through the correlation of yield and soil productivity, real-time yield indices may be presented to the operators of harvesting equipment at a time when they are able to visually associate important information about the crop or the soil (weeds, insects, disease, drainage, fertility, etc.) that identify opportunities to improve management or cultural practices. As yield monitors only record information relating to the harvested material, much information relating to plant health and productivity is left in the field and is not recorded. By alerting the operator to significant changes in relationships in plant productivity, observations about a crop can be noted before important evidence is destroyed. The yield indices generated by this method can also be saved by various recording methods for further review and analysis at a later time.

It is yet another object of the present invention to provide a display, through graphical presentation of information, that is easier for the operator of harvesting equipment to interpret and understand.

Other features and advantages of the present invention will be apparent to persons skilled in the art from the following detailed disclosure of the exemplary embodiment accompanied by the attached drawing where identical reference numerals will refer to like parts in the various views.

DETAILED DESCRIPTION OF THE PREFERRED EMBODIMENT

Soil maps are graphic depictions of soil types in a given unit of land or landscape. Soil types are map units identified and named according to the taxonomic classification of the dominant soil or soils. Within a taxonomic class, there are precisely defined limits for the properties of the soils. One of those properties is soil productivity. Productivity can be expressed as a productivity index (PI) and various soils can therefore be ranked in terms of potential crop productivity.

Figure 1:
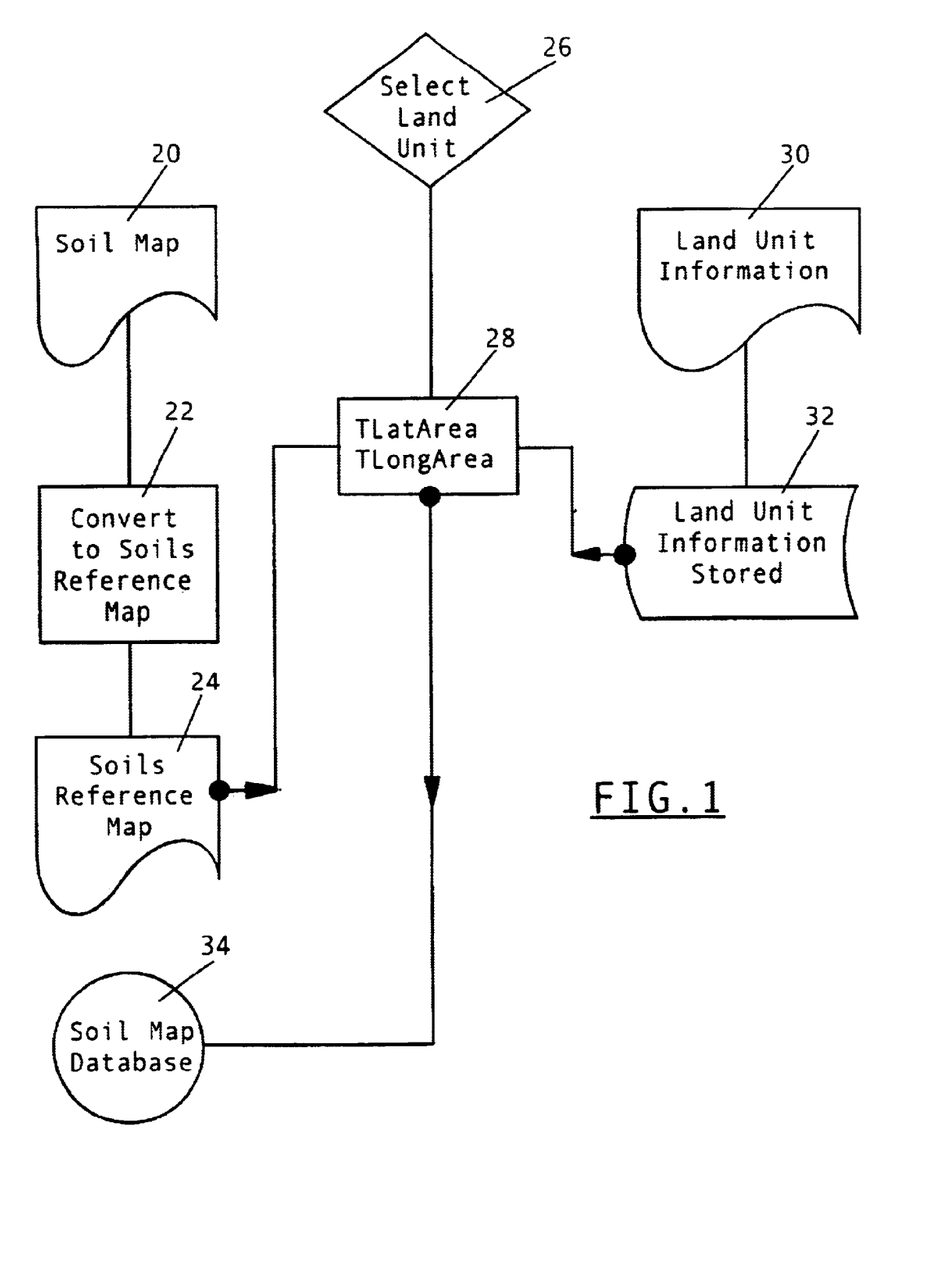
FIG. 1 is a simplified block diagram of an arrangement for establishing universal standards for yield measurements used in agricultural crop production.

The inventive method of the present invention will now be described with reference to FIG. 1 which is a simplified block diagram showing the generation of a soil map database for use in the present invention.

The first step in creating a yield index begins by creating a soils reference map 24 as a base coverage map beginning with a conventional soil map 20 and converting the soil map at step 22 to a soils reference map 24. The soils reference map 24 is generated by using known lat/long coordinates as reference points measured in degrees for the upper left and lower right hand corners of a soils classification map. These points will be referred to as LatRP (Latitude Reference Point) and LongRP (Longitude Reference Point). Unique colors are used for each different soil type area. A sample point on the map, using X/Y coordinates measured in pixels, is stored in a land unit information file 32 for each soil type along with the corresponding productivity index. The latitude and longitude values are stored as positive numbers. The actual size of the map in pixels (Map Width and Map Height) and the total number of different soil types are also stored in a land unit information file 30. There is a different information file for each land unit.

The land unit information 30 is loaded into memory when the land unit is selected at step 26. The corresponding map is loaded into the program. The color of each sample point from the information file is determined from the soil map and stored in an array. The productivity factors are also stored in a corresponding array.

The total latitude area (TLatArea) relative to the soil map is determined at step 28 by the following:

TLatArea=LeftLatRP−RightLatRP

The total longitude area (TLongArea) relative to the soil map is also determined at step 28 by the following:

TLongArea=TopLongRP−BotLongRP/

Figure 2A:
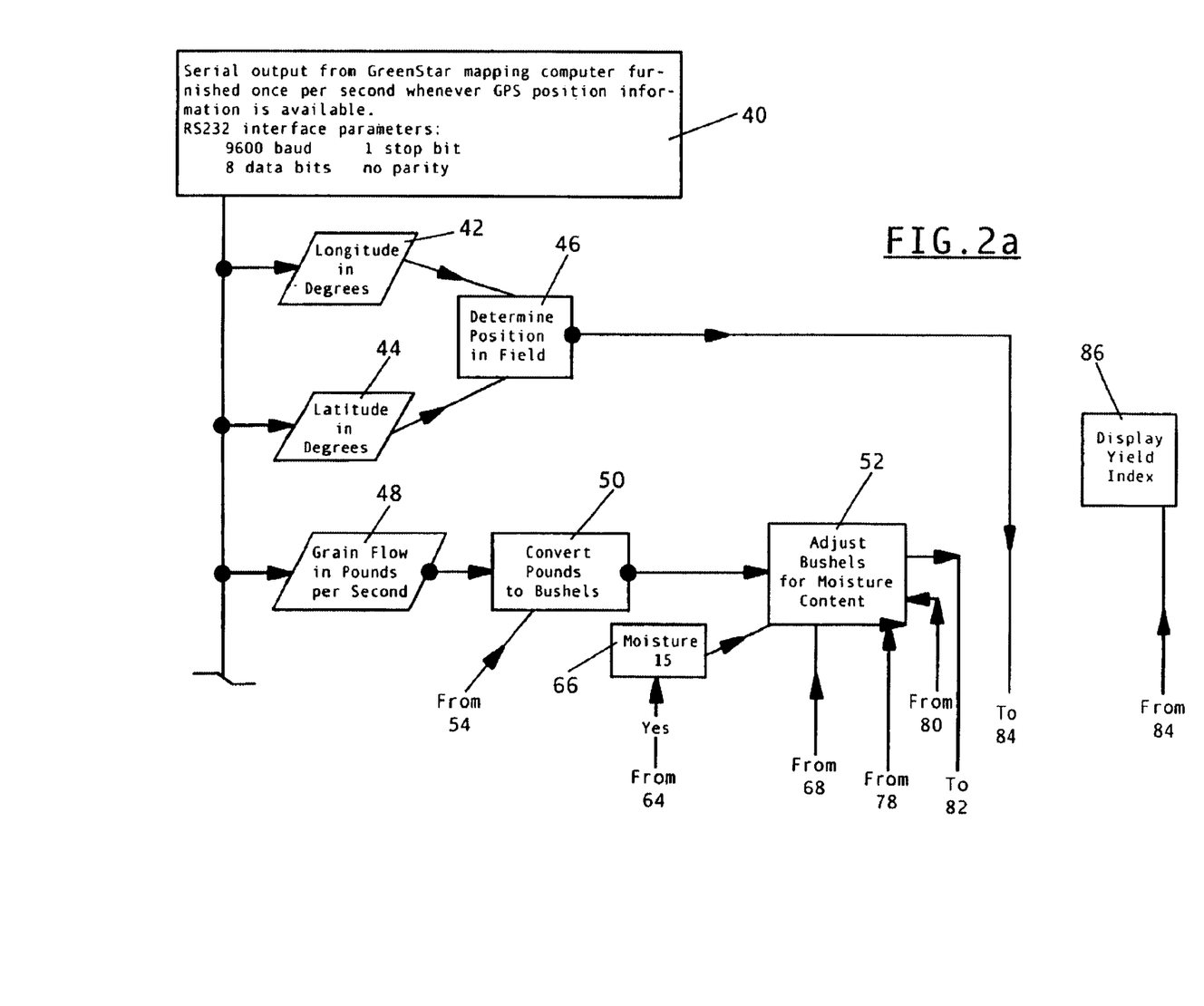
FIG. 2 is a simplified flow chart illustrating the series of steps involved in establishing universal standards as measurement for determining agricultural crop productivity.
Figure 2B:
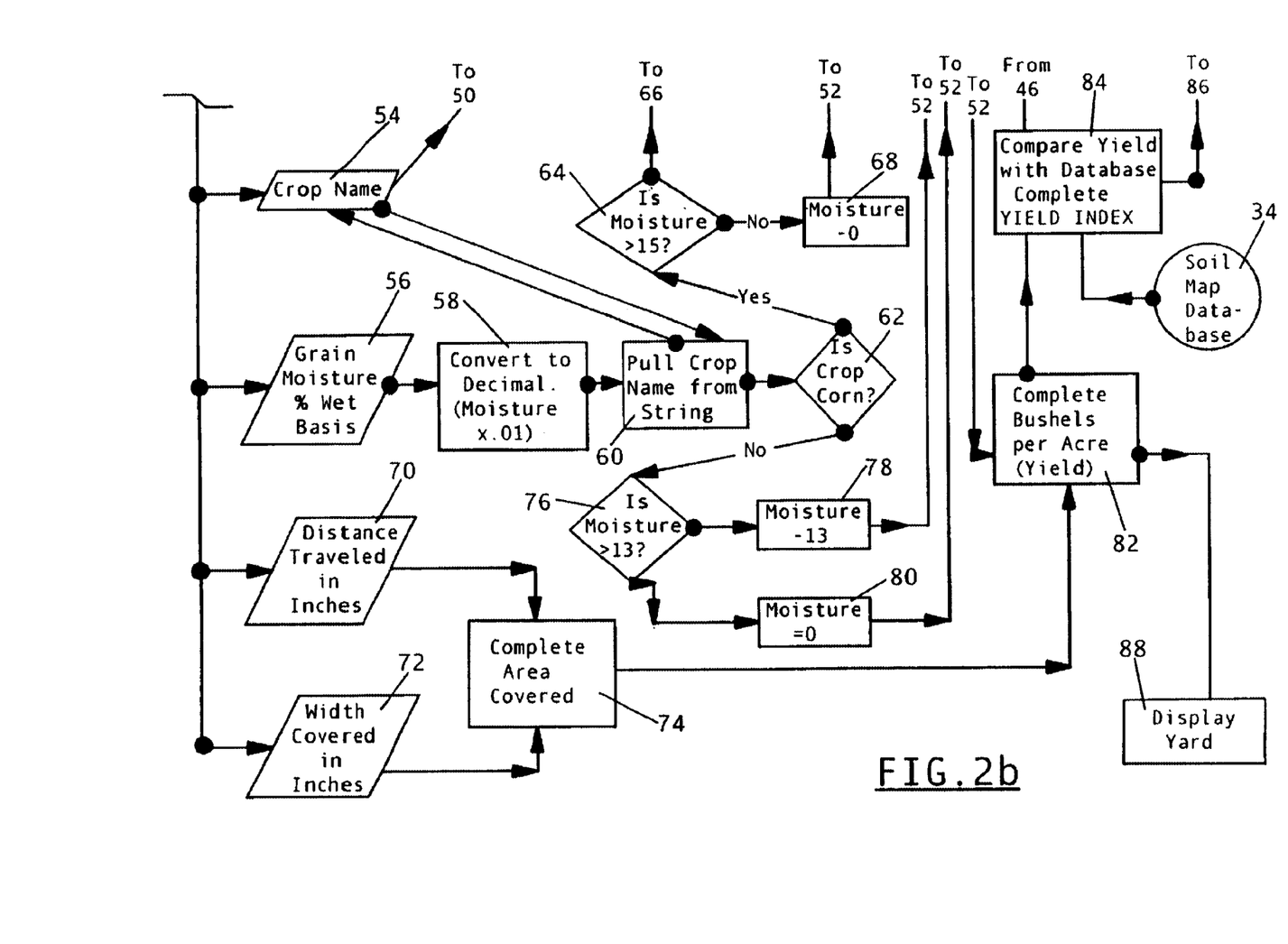
Figure 3:
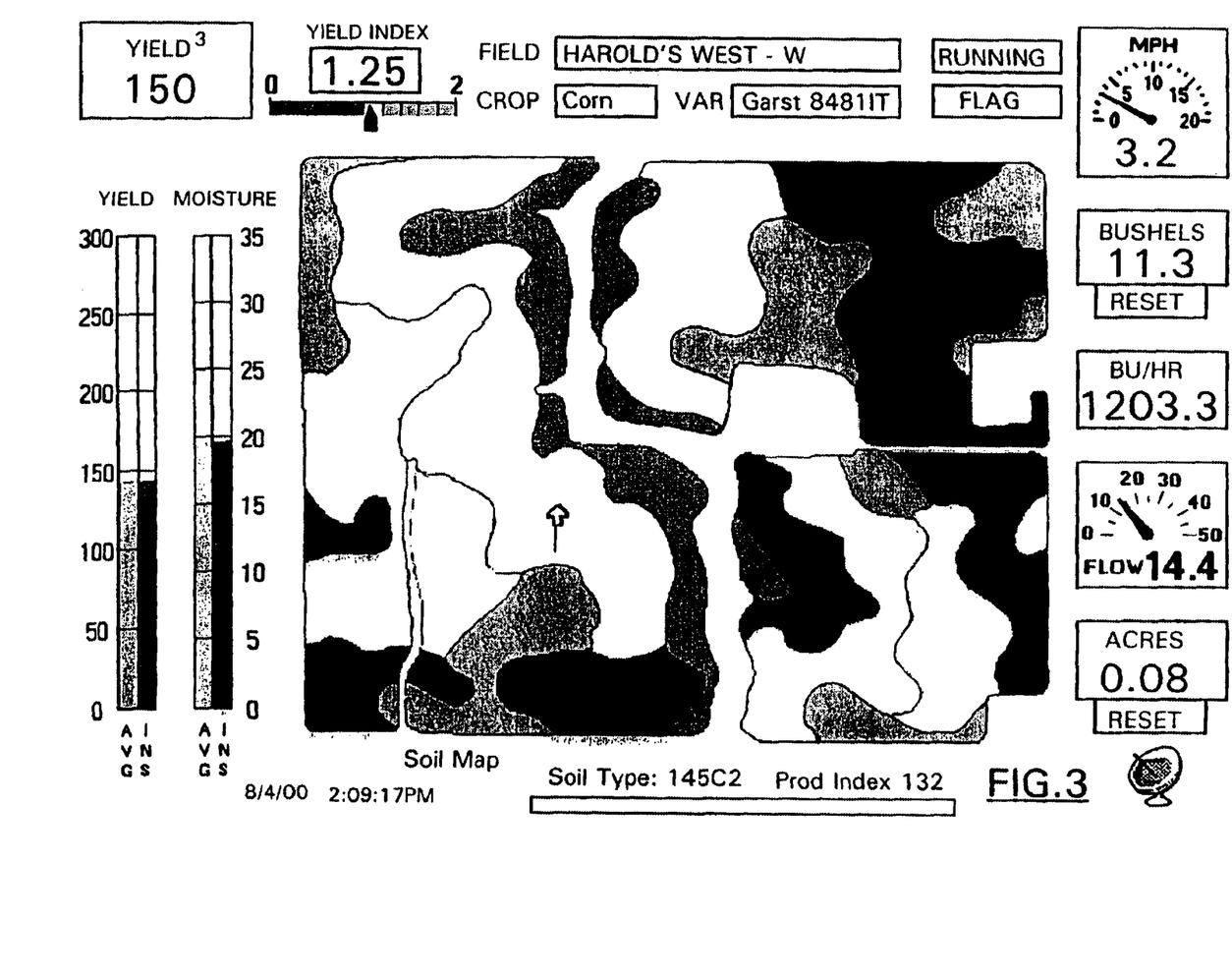
FIGS. 3, 4 and 5 respectively show video display presentations of a soil map, yield map, and a yield index map as provided in establishing universal standards for crop yield measurements in accordance with the principles of the present invention.

Additional details of the invention will now be described with reference to FIG. 2 which is a simplified flow chart illustrating the sequence of steps in determining universal standards for crop yield management in accordance with the principles of the present invention.

A data string from the John Deere Green Star system is fed into the program via a serial communications port at a frequency of once per second at step 40. This string includes current latitude position (ClatPos) in degrees, current longitude position (CLongPos) in degrees, grain flow in pounds per second, moisture content in percentage, distance traveled in inches, width covered in inches, run/hold status, and crop type. The position information is preferably derived from Global Positioning System (GPS) satellites and receivers. These values are stored in variables.

The name of the crop being harvested is entered at step 54. Moisture is converted from % into decimal form at steps 56 and 58 for the particular crop being harvested. Grain flow is converted from pounds to bushels at steps 48 and 50 also for the particular crop being harvested using one of the following formulas depending on crop type:

Corn
Bushels−(Net Weight−((Moisture−0.15*014)*Net Weight)/56
Soybeans
Bushels=(Net Weight((Moisture−0.13*014)*Net Weight)/60

After the moisture is converted from % into decimal form and grain flow is converted from pounds to bushels, the crop name is pulled from the string at step 60 and the number of bushels of the crop is adjusted for moisture content for corn, as determined at step 62, at steps 64, 66, 68 and 52. If the crop is not corn, as determined at step 62, the number of bushels is adjusted for moisture content at steps 76, 78, 80 and 52.

Area covered in acres is determined at steps 70, 72 and 74 by the following formula:

Acre=((Distance/12)*(Width/12))/43560

Yield is determined by the following formula:

Yield=Bushels/Acres

The current latitude area (CLatArea) expressed as a percentage of the total latitude area (TLatArea) with respect to the current latitude position (CLatPos) relative to the left latitude reference point (LeftLatRP) of the soil map is determined at step 42 by the following:

CLatArea=(LeftLatRP−CLatPos)/TLatArea

The current longitude area (CLongArea) expressed as a percentage of the total longitude area (TLongArea) with respect to the current longitude position (CLongPos) relative to the top longitude reference point (TopLongRP) of the soil map is determined at step 48 by the following:

CLongArea=(TopLongRP−CLongPos)/TLongArea

The current position relative to the soil map expressed as a pixel (CPixel) referenced to the X (PixelX) and Y (PixelY) coordinates is determined at step 46 by the following:

PixelX=CLatArea*MapWidth
PixelY=CLongArea*MapHeight
CPixel=PixelX, PixelY

The color value of CPixel of the soil map is checked against the color values stored in the same points array for a match. When a match is found, the value of the corresponding element of the productivity factor array is loaded into a variable as the current productivity factor (CPF).

Using the area covered as computed at step 74, the moisture content adjusted bushels as determined at step 52, and the soil map database 34, the Yield Index is determined at step 84 by the following formula:

Yield Index=Yield/CPF

Yield Index is displayed on the screen in real-time via color coded (red, yellow and green) bar graph with a sliding pointer in conjunction with a digital display above the bar graph. The digital display is also color coded. The numeric values for the color code vary with crop type and individual preference, but remain constant for each land unit harvest operation. Yield Index information is only shown when the combine is in the run mode. Run/hold status is provided in the John Deere Green Star string 40.

Figure 5:
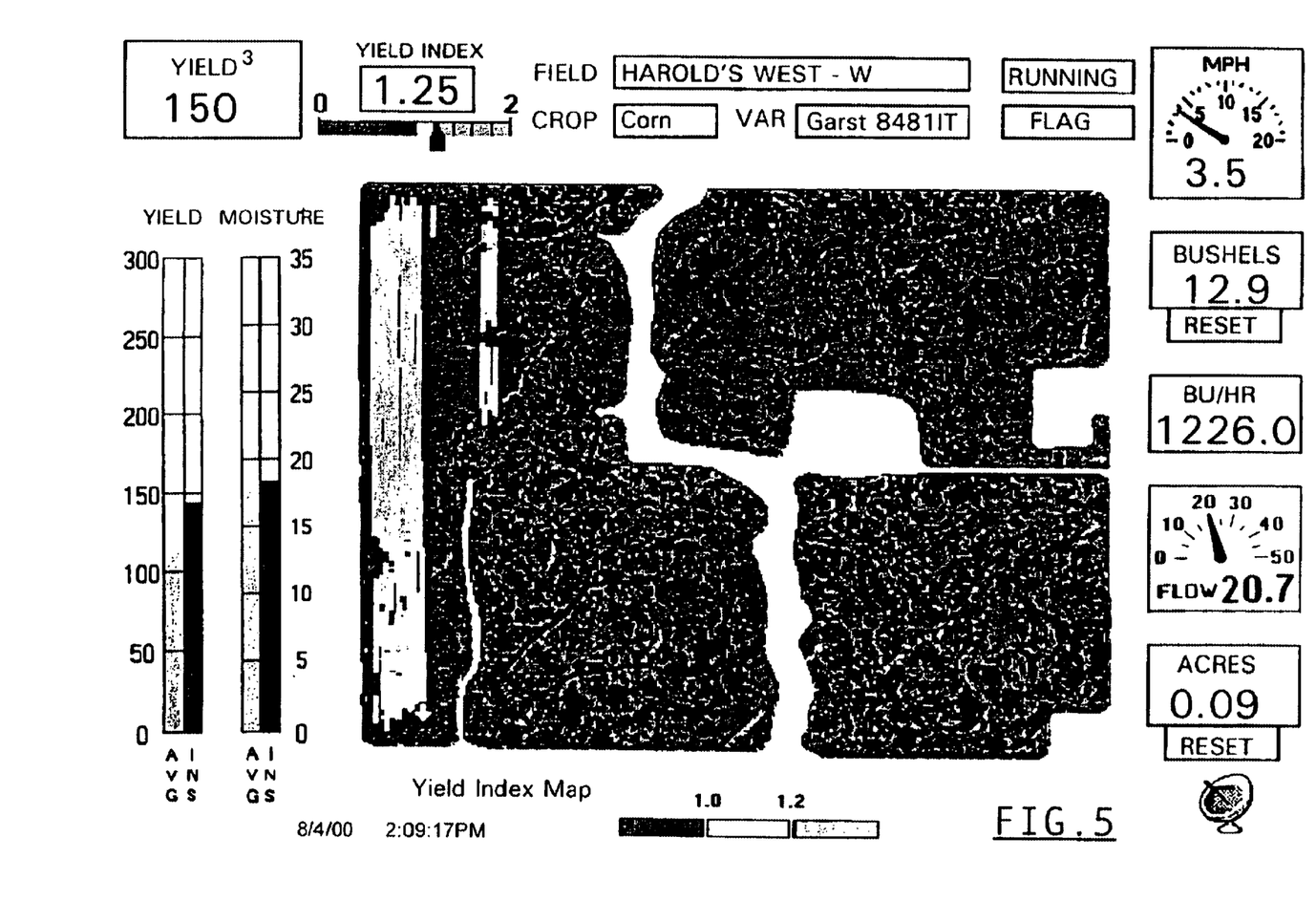

A Yield Index map is displayed on the screen at step 86. The Yield Index map is identical in proportion to the soil map. They differ in that the land unit area of the Yield Index map is comprised of a single color as opposed to the unique colors for individual soil types on the soil map.

Figure 4:
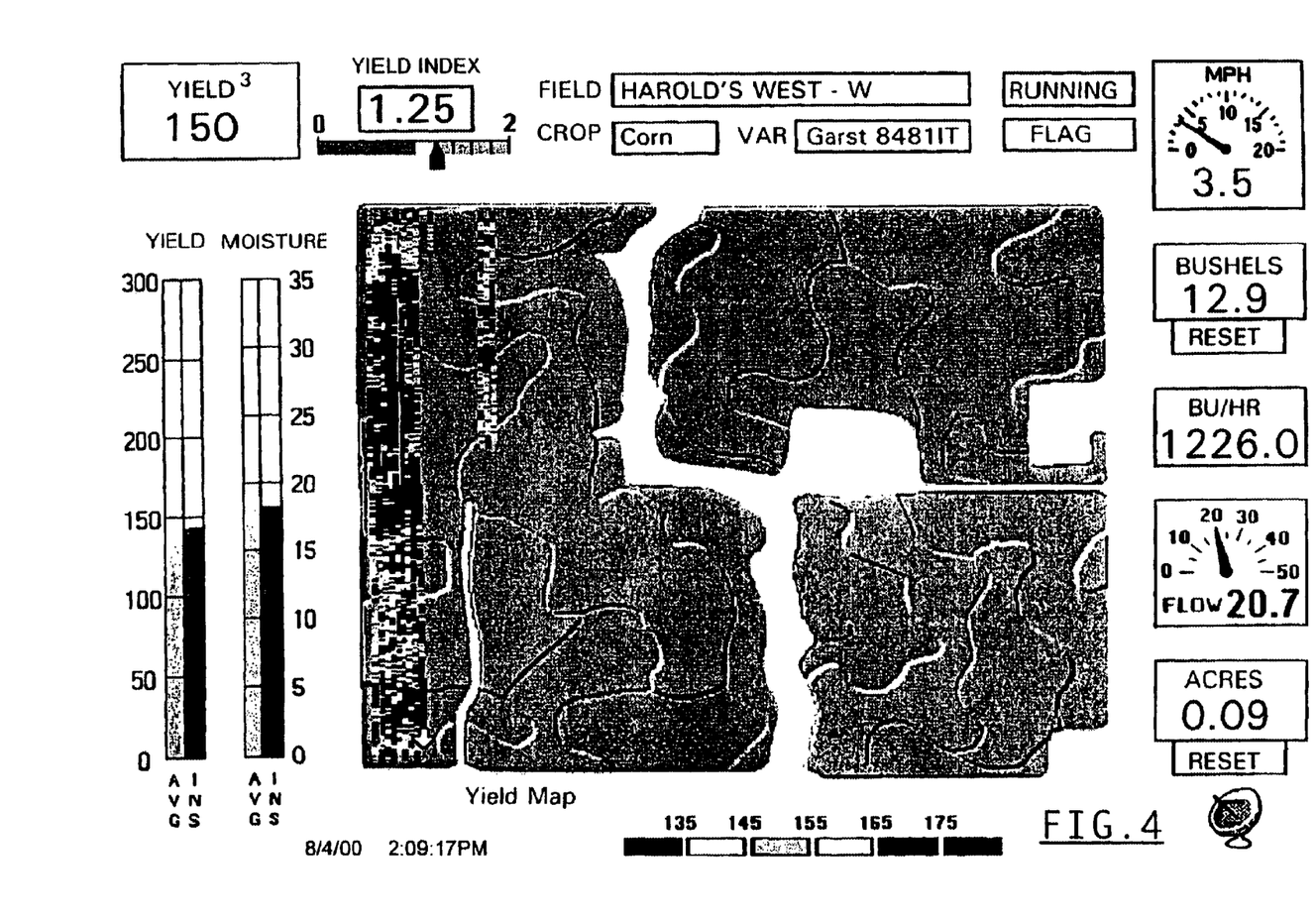

A nine pixel block the Yield Index map is set to the appropriate color depending on the Yield Index value. The center pixel of the block corresponds to CPixel determined in step 48 above. Once again, the color of the pixel block is only set in the run mode, and is done in real-time. Yield information is also plotted in the same manner on a separate yield map. The yield information is also displayed in bar graph and digital formats on the screen at step 88.

The Yield Index map and yield map are saved as bitmap files on a periodic basis, currently every three seconds. This ensures that the maps will be current if the harvest operation is halted and then resumed at a later time. Although the Yield Index information itself is not logged, all necessary data needed to determine Yield Index and positioning is logged and the Yield Index can be recreated at any time.

I claim:

1. A method for establishing a crop yield index representing a measure of a crop grower's efficiency in growing crops, said method comprising the steps of:

selecting a land unit defined by a latitiude and longitude;
providing a soil map of said selected land unit, wherein said soil map is a graphic depiction of soil types within said selected land unit;
converting said soil map to a soils reference map wherein each soil type within said selected land unit is represented by a different color and wherein each type is characterized by a productivity index;
determining location of a harvesting machine within said selected land unit, amount of grain harvested in bushels, grain moisture content, soil area covered in acres and crop type;
calculating crop yield by dividing the number of bushels of grain harvested by the number of acres covered by said harvesting machine;

determining a current productivity factor by comparing the calculated crop yield with said productivity index; and calculating the crop yield index in real time by dividing said crop yield by said current productivity factor.

2. The method of claim 1 wherein the step of converting said soil map to a soils reference map includes designating upper left-hand and lower right-hand corners of a soils classification map as reference points measured in degrees.

3. The method of claim 1 wherein the step of determining location within said selected land unit includes detecting and storing in a memory current latitude and longitude positions in degrees of said harvesting machine.

4. The method of claim 1 wherein the step of determining the amount of grain harvested includes measuring grain flow in pounds per second.

5. The method of claim 4 wherein the step of determining the soil area covered includes measuring distance traveled and width covered in inches.

6. The method of claim 5 further comprising the step of determining run/hold status.

7. The method of claim 1 wherein the step of determining the amount of grain harvested includes adjusting this amount by the moisture content of the grain.

8. The method of claim 1 wherein the step of determining location within said selected land unit includes determining a current latitude area and a current longitude area as a percentage respectively of a total latitude area and a total longitude area associated with said selected land unit.

9. The method of claim 1 further comprising the step of presenting a soils reference map for said selected land unit on a video display.

10. The method of claim 9 further comprises a step of presenting current position of the crop harvesting machine in said land unit on said video display.

11. The method of claim 10 further comprising the step of presenting the crop yield index on said video display.

12. The method of claim 1 further comprising the step of storing various parameters determined and calculated in said method in a memory for subsequent recall.

* * * * *

UNITED STATES PATENT AND TRADEMARK OFFICE
CERTIFICATE OF CORRECTION

PATENT NO.   : 6,651,005 B2
DATED        : November 18, 2003
INVENTOR(S)  : Donald L. O'Neall It is certified that error appears in the above-identified patent and that said Letters Patent is hereby corrected as shown below:

<u>Column 4,</u>
Line 59, delete the word "each type" and insert instead the words -- each soil type --

Signed and Sealed this

Thirteenth Day of January, 2004

JON W. DUDAS
*Acting Director of the United States Patent and Trademark Office*